United States Patent

Murdock et al.

[11] Patent Number: 5,818,963
[45] Date of Patent: Oct. 6, 1998

[54] METHOD AND SYSTEM FOR RECOGNIZING A BOUNDARY BETWEEN CHARACTERS IN HANDWRITTEN TEXT

[76] Inventors: Michael Murdock, 1165 Starwood Pass, Lake In The Hills, Ill. 60102; Shay-Ping T. Wang, 1701 Edgewood La., Long Grove, Ill. 60047

[21] Appl. No.: 743,332

[22] Filed: Nov. 4, 1996

Related U.S. Application Data

[63] Continuation of Ser. No. 304,008, Sep. 9, 1994, abandoned.

[51] Int. Cl.⁶ .............................. G06K 9/00; G06K 9/62; G06K 9/68; G06K 9/74
[52] U.S. Cl. ......................... 382/187; 382/159; 382/227; 382/228; 382/178
[58] Field of Search ...................................... 382/159, 173, 382/177, 178, 179, 186, 187, 190, 199, 203, 120, 122, 241, 242, 224, 225, 228, 156, 227; 395/21

[56] References Cited

U.S. PATENT DOCUMENTS

| | | | |
|---|---|---|---|
| 4,149,081 | 4/1979 | Seppi | 250/445 T |
| 4,654,873 | 3/1987 | Fujsawa et al. | 382/178 |
| 4,718,103 | 1/1988 | Shojima et al. | 382/241 |
| 4,764,972 | 8/1988 | Yoshida et al. | 382/187 |
| 4,771,474 | 9/1988 | Takashima et al. | 382/241 |
| 4,907,282 | 3/1990 | Daly et al. | 382/242 |
| 5,042,001 | 8/1991 | Brightman et al. | 364/736 |
| 5,060,279 | 10/1991 | Crawford et al. | 382/156 |
| 5,101,437 | 3/1992 | Plamondon | 382/122 |
| 5,105,468 | 4/1992 | Guyon et al. | 382/187 |
| 5,115,479 | 5/1992 | Murayama | 382/241 |
| 5,161,204 | 11/1992 | Hutcheson et al. | 382/190 |
| 5,233,671 | 8/1993 | Murayama | 382/242 |
| 5,251,265 | 10/1993 | Döhle et al. | 382/228 |
| 5,295,201 | 3/1994 | Yokohama | 382/241 |
| 5,309,521 | 5/1994 | Matsukawa | 382/242 |
| 5,321,768 | 6/1994 | Fenrich et al. | 382/179 |
| 5,323,470 | 6/1994 | Kara et al. | 382/107 |
| 5,335,166 | 8/1994 | Stephenson | 364/166 |
| 5,343,537 | 8/1994 | Bellegarda et al. | 382/186 |
| 5,479,523 | 12/1995 | Gaborski et al. | 382/159 |
| 5,602,938 | 2/1997 | Akiyama et al. | 382/155 |

OTHER PUBLICATIONS

"Polynomial Descriminant Method for Handwritten Digit Recognition" by Uma Shirivasan. State University of New York at Buffalo, Dec. 14, 1989.

*Primary Examiner*—Bipin Shalwala
*Attorney, Agent, or Firm*—Jeffrey G. Toler; Douglas D. Fekete; James E. Gauger

[57] ABSTRACT

A method and system for identifying boundaries of characters in handwritten text by classifying segment strokes provides improved performance in a handwriting recognition system. A segment stroke is a portion of handwritten text which includes a boundary between two characters. The segment stroke is recognized by the same method used to recognized characters. Recognition of a segment stroke is accomplished by training a learning machine to act as a classifier which implements a discriminant function based on a polynomial expansion.

22 Claims, 6 Drawing Sheets

METHOD AND SYSTEM FOR RECOGNIZING A BOUNDARY BETWEEN CHARACTERS IN HANDWRITTEN TEXT

This is a continuation of application Ser. No. 08/304,008, filed Sep. 9, 1994 and now abandoned.

RELATED INVENTIONS

The present invention is related to the following invention which is assigned to the same assignee as the present invention:

(1) "Neural Network and Method of Using Same", having Ser. No. 08/076,601, filed on Jun. 14, 1993.

The subject matter of the above-identified related invention is hereby incorporated by reference into the disclosure of this invention.

TECHNICAL FIELD

This invention relates generally to character recognition and, in particular, to a method and system for identifying characters contained in handwritten text.

BACKGROUND OF THE INVENTION

Prior art handwriting recognition systems are commonly of a design which limits their ability to reliably identify cursive or partially connected handwritten text. A fundamental problem of current handwriting recognition systems is that they cannot consistently identify individual characters contained in a sample of cursively written text. In general, prior art systems have attempted to overcome this problem using one of three approaches. All three approaches rely on segmenting a continuous pen stroke in order to isolate individual characters within the stroke.

Using the first prior art approach, the characters are isolated by segmenting the cursive stroke based on pen pressure. The assumption is that as the end of character nears, the writer will ease up on the pen and not press as hard, thus allowing the beginning and end of a character to be recognized. There are two problems with this approach: first, not all writers vary their pen pressure; therefore, the system will not work reliably for all users; second, a device which senses and records pen pressure vastly increases the complexity and cost of a handwriting recognition system.

The second prior art approach attempts to isolate characters by segmenting the cursive text based on curvilinear velocity of the pen tip. The assumption here is that as the end of the character nears, the writer will slow down. Conversely, at the start of the next character, the writer will speed up. This is a very unreliable approach as there are many situations, besides the beginning and ending of a character, when a writer will slow down and then speed up. In a third prior art approach, characters are isolated by segmenting the cursive text at points where the pen tip is not moving in the vertical direction. It is assumed that such points exist only between characters. This again is also a very unreliable assumption. Almost every writer has a style wherein the connecting stroke between at least some of the characters has a velocity in the vertical direction.

The three prior art approaches discussed above will isolate some characters. However, the number of mistakes that they induce seriously reduces the ability of a handwriting recognition system to achieve a high level of accuracy.

Another limitation of many available handwriting recognition systems is that they require an extensive amount of time to train. Generally, the burden of training a recognition system falls on the user, thus making the use of the system a time consuming chore.

Therefore, there is a significant need for a handwriting recognition system which allows cursive handwritten text to be accurately processed in a manner that reduces the overall complexity of the handwriting recognition system. Such a system must reliably isolate individual characters contained in the text. In addition, there is a need for a handwriting recognition system which doesn't require repetitive training.

SUMMARY OF INVENTION

It is thus an advantage of the present invention to provide a method for identifying characters from cursively written text. The method recognizes boundaries between characters, thereby vastly increasing the likelihood of correctly identifying characters.

Another advantage of the present invention is to provide a method and system for training a learning machine to identify characters from handwritten text wherein the method and system do not require a repetitive or lengthy training period.

A further advantage of the present invention is to provide a system which allows boundaries between characters in handwritten text to be identified in the same manner that characters are identified, thus reducing the overall complexity of the system.

In one embodiment of the present invention there is provided a method for recognizing a boundary between two characters in a sample of handwritten text. This method is applicable in a system for recognizing a plurality of characters from a sample of handwritten text. The method comprises the following steps: receiving the sample of handwritten text; defining a segment stroke, which includes the boundary, as one of the plurality of characters; and recognizing the boundary by identifying the segment stroke in the sample of handwritten text.

In another embodiment of the present invention there is provided a method of using a learning machine to recognize a segment stroke. This embodiment of the present invention includes the following steps: training the learning machine, with a plurality of handwriting examples, to identify the segment stroke; receiving a handwritten stroke which includes the segment stroke; extracting a plurality of features from the handwritten stroke; and recognizing the segment stroke in the handwritten stroke by classifying the features.

In a further embodiment of the present invention, there is provided a handwriting recognition system for recognizing at least one character from a handwritten stroke. Such embodiment of the present invention includes a trainer which trains a learning machine to identify at least one character by creating a character classifier. Additionally, the trainer provides a plurality of handwriting examples. The system also includes a substroke extractor which receives the handwritten stroke and generates a plurality of substrokes; a feature extractor which is responsive to the plurality of substrokes and extracts a plurality of features from the handwritten stroke; and a recognizing means which is operatively coupled to the feature extractor and the learning machine. The recognizing means recognizes at least one character in the handwritten stroke by applying the character classifier to the plurality of features.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the methods of the present invention may be implemented in hardware or software, or any combination thereof, and that the terms "stroke", "handwritten stroke", and "handwriting stroke" are used interchangeably in this description.

Figure 1:
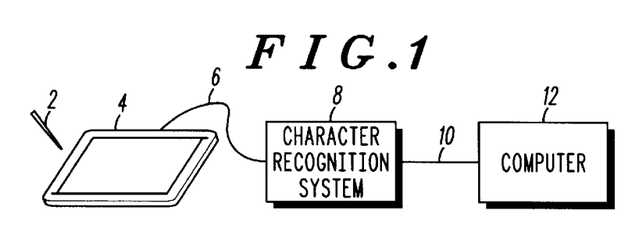
FIG. 1 shows a contextual diagram of a handwriting recognition system as used by the method and system of the present invention.

FIG. 1 shows a contextual block diagram of a character recognition system used in one embodiment of the present invention. Character recognition system 8 is connected to digitizer tablet 4 by bus 6 and to computer 12 by bus 10. In the example shown, digitizer tablet 4 preprocesses user input, and character recognition system 8 receives the preprocessed user input across bus 6. Character recognition system 8 then identifies characters included in the user input and transmits, in a suitable computer-readable form, the identity of the characters across bus 10 to computer 12.

In an embodiment of the present invention herein disclosed, character recognition system 8 is used to identify characters contained in handwritten text. Such a system may be used to identify characters from many different languages and alphabets. For example, a set of identifiable characters may include the upper and lower case English alphabet, numerals, or punctuation marks. This character recognition system 8 contains the novel features for recognizing the boundary between two characters as will be described in further detail in conjunction with FIG. 3.

A user of such a system uses pen or stylus 2 to write text onto digitizer tablet 4. Digitizer tablet 4 captures handwritten text and converts it into a digital format. Essentially, digitizer tablet 4 provides a flat surface upon which a user writes text. The surface may be represented as a coordinate plane which has an x-axis and y-axis. Thus, a point on the surface may be represented by a coordinate pair (x, y). The surface includes a flat panel of charge coupled devices which are sensitive to the motion of the tip of pen 2, and the surface possibly includes a liquid crystal display (LCD) for pixel display of the motion of pen 2. The position and movement of pen 2 is captured by the panel and digitized as a sequence of coordinate pairs, (x, y), while the user is writing on the surface. The sequence of coordinate pairs is then passed via bus 6 to character recognition system 8.

One of ordinary skill in the art will appreciate that character recognition system 8 is not limited to receiving user input from a digitizer tablet and that other devices, for example an optical scanner, may instead be used to provide user input to character recognition system 8. Additionally, one of ordinary skill will understand that character recognition system 8 may transmit character identities to devices other than a computer. For example, a communication network, data storage system, or transcription device could be substituted for computer 12.

In accordance with an embodiment of the present invention, character recognition system 8 performs as a handwriting recognition system. In this capacity, the functions of character recognition system 8 include substroke extraction, feature extraction, and feature classification. The functions of character recognition system 8 are further described in reference to FIG. 2.

Figure 2:
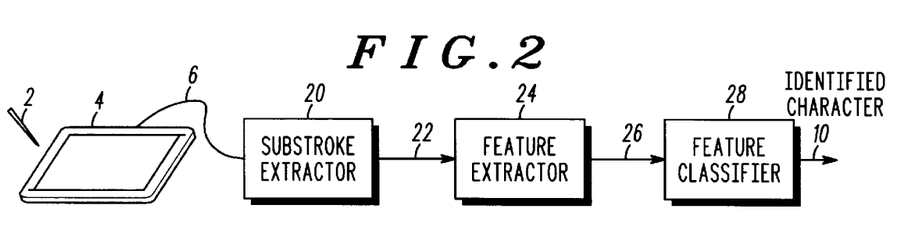
FIG. 2 illustrates a block diagram of a handwriting recognition system used by the method and system of the present invention.

FIG. 2 illustrates a block diagram of a handwriting recognition system used in conjunction with one embodiment of the present invention. Pen 2 is used to enter handwritten text onto digitizer tablet 4. Digitizer tablet 4 provides a plurality of coordinate pairs, which represent the handwritten text, via bus 6 to substroke extractor 20. Substroke extractor 20 creates a plurality of substrokes. Each substroke comprises a set of coordinate pairs. The substrokes generated by substroke extractor 20 are passed across bus 22 to feature extractor 24. Feature extractor 24 processes substroke data to extract a set of features, or measurements, that contain the same information as the substroke but with reduced dimensionality. The features generated by feature extractor 24 are passed across bus 26 to feature classifier 28. Feature classifier 28 identifies a character from the handwritten text based on the extracted features it receives. In a preferred embodiment of the present invention, the novel boundary recognizing method and system are implemented in the feature classifier 28. A signal which provides the identity of the character is generated as an output of the handwriting recognition system on bus 10.

Operation of the handwriting recognition system commences when a user writes a stroke of handwriting onto digitizer tablet 4 with pen 2. A stroke is defined as a sequence of samples taken from the handwriting, beginning when the pen initially contacts the writing surface of digitizer tablet 4 and ending when the pen subsequently breaks contact with the writing surface. A stroke may include part of a character, a complete character, or many characters. Essentially, the sequence of samples is a sequence of coordinate pairs, (x, y), which represent points on the writing surface contacted by the tip of pen 2; thus, a stroke comprises a sequence of coordinate pairs. Each coordinate pair is typically coded as one or more digital words and transmitted to substroke extractor 20 using bus 6.

Substroke extractor 20 creates a plurality of substrokes from a stroke of handwriting. Each substroke comprises a plurality of coordinate pairs. Although a substroke may contain any number of coordinate pairs, in a preferred embodiment of the present invention, each substroke includes a sequence of 15 coordinate pairs. Essentially, a substroke codes only a fraction of one character. By creating substrokes, an embodiment of the present invention may obtain a very high level of accuracy and robustness by incrementally accumulating recognition evidence by classifying the substrokes. In addition, the use of substrokes allows greater immunity to hand/pen jitter, character flourishes, and noise from digitizer tablet 4. The substrokes generated by substroke extractor 20 are transferred across bus 22 to feature extractor 24. Feature extractor 24 processes substroke data to extract a set of features, or measurements, that contain the same information as the substroke but with reduced dimensionality. Examples of features which might be extracted are average rectilinear and angular velocity, either of which may be calculated from the coordinate pairs of a substroke. The feature extraction, which is performed on the substrokes, results in a representation of the substrokes which characterizes the relevant features of the handwritten text. It can be regarded as a data reduction procedure that retains vital characteristics of the handwritten text while eliminating the undesirable interference from irrelevant characteristics of the text, thus easing the decision-making process of feature classifier 28.

Feature classifier 28 identifies characters from the handwritten text based on the extracted features it receives across bus 26. In general, a feature classifier makes a decision as to which class an input pattern belongs. Specifically, feature classifier 28 implements one or more discriminant functions, each of which utilizes the extracted features. The discriminant functions assist in determining the class to which the extracted features belong. Each class is labeled with a character identity. After receiving a sufficient number of extracted features to determine the identity of a character, feature classifier 28 generates the identity of the character as an output of the handwriting recognition system on bus 10.

A difficulty with classifying characters occurs when a user writes cursively, that is, when a user writes a stroke which contains a plurality of characters. In order to correctly identify each of the characters, a handwriting recognition system must identify where one character ends and the next begins in a stroke. Thus, there is provided by a preferred embodiment of the present invention a method for identifying the boundary between two characters in a stroke of handwritten text.

Figure 3:
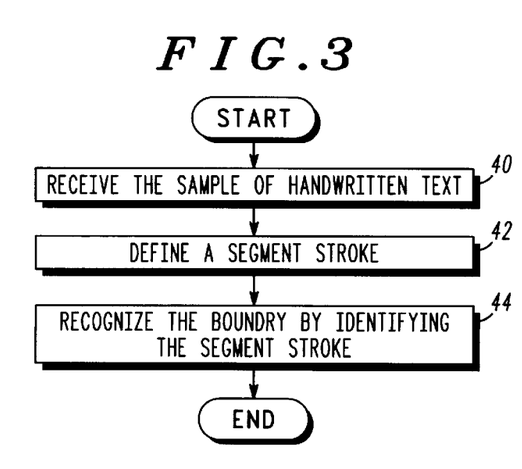
FIG. 3 shows a flow diagram of a method of identifying a segment stroke from a sample of handwritten text in accordance with a preferred embodiment of the present invention.

FIG. 3 shows a flow diagram of a method of identifying a segment stroke from a sample of handwritten text in accordance with a preferred embodiment of the present invention. In box 40, a sample of handwritten text, which comprises a stroke, is received. A stroke may include more than one character.

In box 42, a segment stroke is defined. A segment stroke is the portion of a stroke which occurs between two characters. Essentially, a segment stroke contains the boundary between two characters which are included in a stroke. A segment stroke may comprise one or more substrokes.

Next, in box 44, the boundary between two characters in the sample of handwritten text is recognized by identifying the segment stroke. Although a segment stroke does not represent a textual character, it may be identified using a means or method similar to that used for identifying a character.

Figure 4:
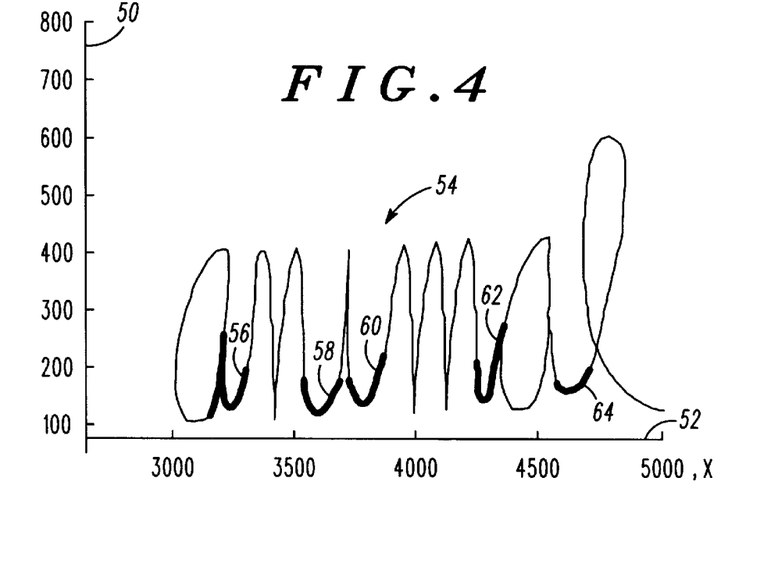
FIG. 4 illustrates an example of typical cursive handwriting.

FIG. 4 illustrates an example of typical cursive handwriting. Handwriting stroke 54 is of the word "animal" and is depicted as being written on a coordinate plane, the dimensions of which are given by axes 50 and 52. Stroke 54 may be represented as a plurality of pixels, wherein each pixel is associated with a coordinate pair, (x,y). The y coordinate of each pixel is given by axis 50; and the x coordinate of each pixel is given by axis 52. Sample 54 includes five segment strokes. The segment strokes are identified by numerals 56, 58, 60, 62, and 64.

Figure 5:
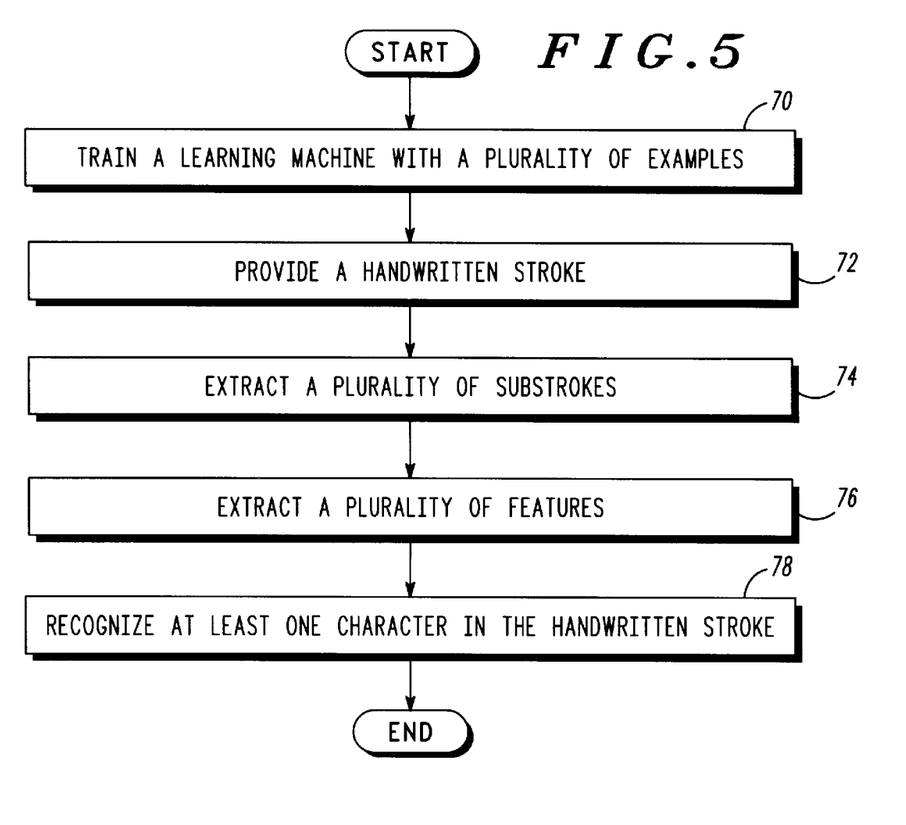
FIG. 5 shows a flow diagram of a method of using a learning machine to recognize characters in a stroke of handwritten text.

FIG. 5 shows a flow diagram of a method of using a learning machine to recognize characters in a stroke of handwritten text. A learning machine may be a neural network or any other system which may be inductively trained to classify patterns.

In box 70, the learning machine is trained with a plurality of handwriting examples. In one embodiment of the present invention, the plurality of handwriting examples includes examples of letters, numerals, punctuation marks and segment strokes. A handwriting example is defined as a set of given inputs and a desired output (s). For instance, a handwriting example may include as given inputs a set of features extracted from a cursively written letter, and as desired output, the example may include a binary code which represents the letter in ASCII.

Training the learning machine transforms the learning machine into a device which is capable of classifying the data it receives; thus, in a preferred embodiment of the present invention, a trained learning machine is capable of classifying segment strokes.

In box 72, a handwritten stroke is provided. The handwritten stroke may include a plurality of unidentified characters which are separated by segment strokes.

Next, in box 74, a substroke extractor generates a plurality of substrokes from the handwritten stroke.

In box 76, a frame extractor extracts a plurality of features from the plurality of substrokes. As an example, the extracted features may include angular velocity, curvilinear velocity, stroke angle, stroke curvature, Fourier coefficients, or the coefficients to a first order polynomial which is fitted to the curvilinear or angular velocity profiles of portions of the handwritten stroke.

In box 78, at least one character in the handwritten stroke is identified by classifying the features. When the handwritten stroke comprises characters which are separated by segment strokes, the segment strokes must also be identified in order to determine the boundaries of each character. Determining the boundaries of a character increases the probability of correctly identifying the character. Segment strokes are identified in the same manner as characters. That is, they are identified by classifying features.

Figure 6:
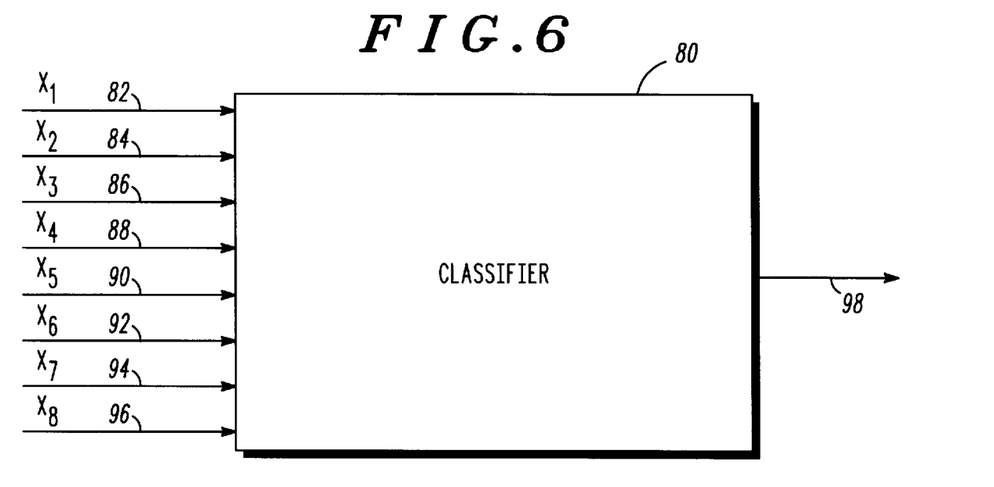
FIG. 6 illustrates a segment classifier which receives a plurality of extracted features.

FIG. 6 illustrates a classifier which receives a plurality of extracted features. Classifier 80 receives extracted features on its inputs 82, 84, 86, 88, 90, 92, 94, and 96. The features may be simultaneously received on the inputs. In the example shown, the set of features received by classifier 80, include coefficients $a_0, a_1, \ldots,$ and $b_0, b_1, \ldots$ of the first order polynomials which are fitted to the curvilinear and angular velocity profiles given by Equation 2 and Equation 3 which follow, respectively.

In a preferred embodiment of the present invention, a parametric decision method is used by classifier 80 to determine whether a set of features belongs to a certain class. A class may represent either a character or a segment stroke. Using a parametric decision method, classifier 80 implements a discriminant function $y(X)$, where $X=\{x_1, x_2, \ldots, x_i\}$ is the set of features and i is an integer index. Upon receiving a set of features, classifier 80 computes its respective discriminant function and produces the result on output 98. Generally, the amplitude of the result indicates whether a set of features belongs to the class which corresponds to the discriminant function. In a preferred embodiment of the present invention, the amplitude of the result is directly proportional to the likelihood that the set of features belongs to the corresponding class.

The discriminant function implemented by classifier 80 is based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment of the present invention employs a polynomial expansion of which the general case is represented by Equation 1 as follows:

$$y = \sum_{i=1}^{m} w_{i-1} * x_1^{g_{1i}} * x_2^{g_{2i}} * \ldots * x_n^{g_{ni}} \qquad \text{Equation 1}$$

where $X_i$ represents the classifier inputs and can be a function such as $x_i = f_i(z_j)$, wherein $z_j$ is any arbitrary variable, and where the indices i, j, and m may be any integers; where y represents the output of the classifier; where $w_{i-1}$ represents the coefficient for the ith term; where $g_{1i}, \ldots, g_{ni}$ represent the exponents for the ith term and are integers; and n is the number of classifier inputs.

Figure 7:
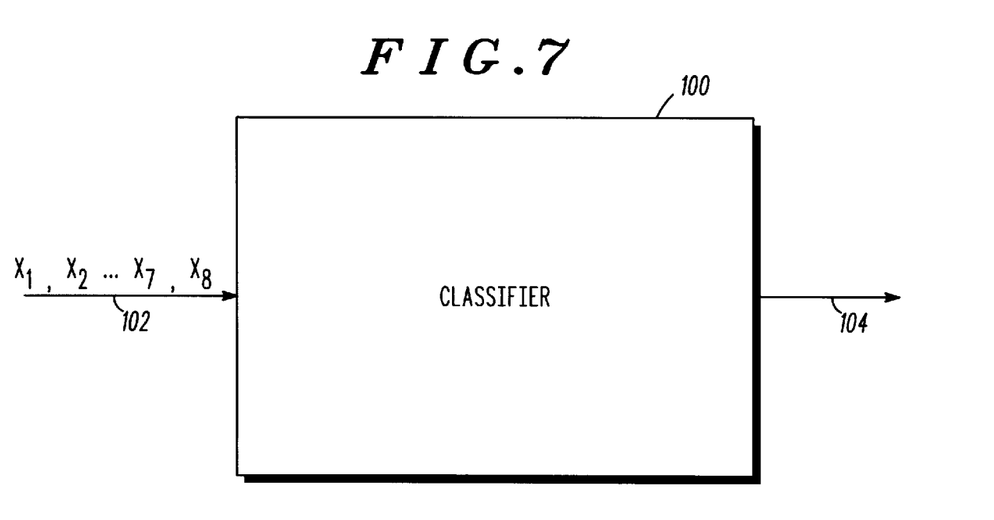
FIG. 7 illustrates a segment classifier which receives a sequence of extracted features.

FIG. 7 illustrates a classifier which receives a sequence of extracted features. Each of the extracted features are fed across input 102 to classifier 100. Classifier 100 performs essentially the same functions as classifier 80 of FIG. 8. Classifier 100 provides the results of its operations on output 104. In the example shown, the set of features received by classifier 100, include coefficients $a_0, a_1, \ldots$, and $b_0, b_1, \ldots$ of the first order polynomials which are fitted to the curvilinear and angular velocity profiles given by Equation 2 and Equation 3, respectively.

Figure 8:
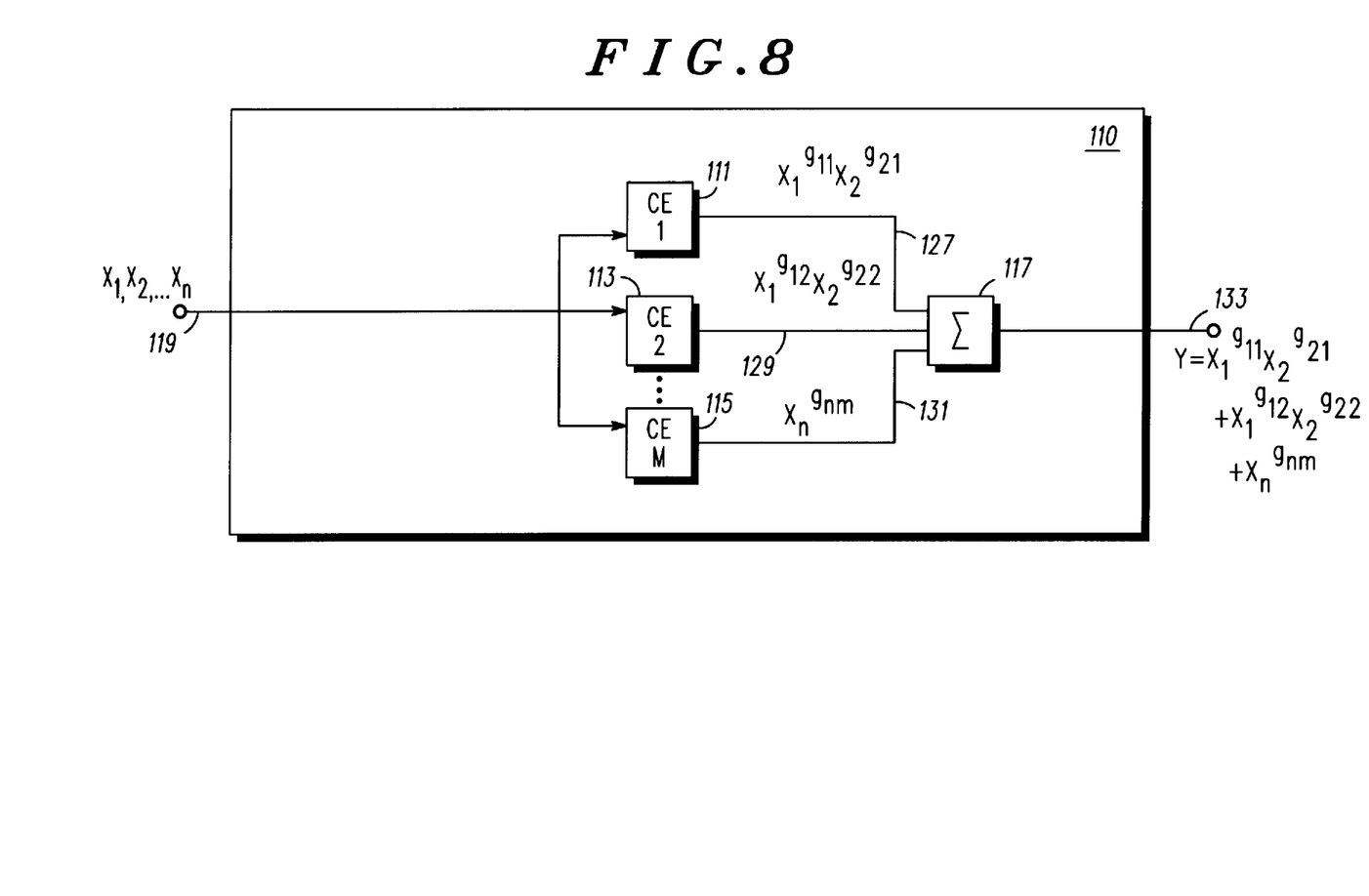
FIG. 8 is a block diagram of the segment classifier shown in FIG. 7 in accordance with a preferred embodiment of the present invention.

FIG. 8 illustrates a block diagram of the classifier shown in FIG. 7 in accordance with a preferred embodiment of the present invention. Computer 110 implements segment classifier 100 of FIG. 7. Computer 110 includes a plurality of computing elements, of which computing elements 111, 113, and 115 are shown. Computer 110 also includes summation circuit 117.

A polynomial expansion is calculated by computer 110 in the following manner. A plurality of data inputs $x_1, x_2, \ldots, x_n$ are fed into computer 110 using bus 119 and 35 then distributed to the plurality of computing elements, represented by 111, 113, and 115. Typically, the data inputs would be extracted features. Each computing element computes a term in the polynomial expansion and determines which of the data inputs to receive. After computing a term, a computing element passes the term to summing circuit 117 which sums the terms computed by the computing elements and places the sum on computer output 133.

For example, FIG. 8 depicts the computation of the polynomial $y = x_1^{g_{11}} x_2^{g_{21}} + x_1^{g_{12}} x_2^{g_{22}} + \ldots x_n^{g_{nm}}$, where n is the number of inputs and m is the number of terms in the polynomial. Computing element 111 computes the term $x_1^{g_{11}} x_2^{g_{21}}$ and then sends it to summing circuit 117 over bus 127; computing element 113 computes the term $x_1^{g_{12}} x_2^{g_{22}}$ and then sends it to summing circuit 117 over bus 129; and computing element 115 computes the term $x_n^{g_{nm}}$ and then sends it to summing circuit 117 over bus 131. Upon receiving the terms from the computing elements, summing circuit 117 sums the terms and places the resulting polynomial expansion on computer output 133.

It will be apparent to one of ordinary skill that computer 110 is capable of computing polynomials of the form given by Equation 1 which have a number of terms different from the above example, and polynomials whose terms are composed of data inputs different from those of the above example.

In one embodiment of the present invention, the computer 110 is implemented by software running on a processor such as a microprocessor. However, one of ordinary skill in the art will recognize that a programmable logic array, ASIC or other digital logic device could also be used to implement the functions performed by the computer 110.

Figure 9:
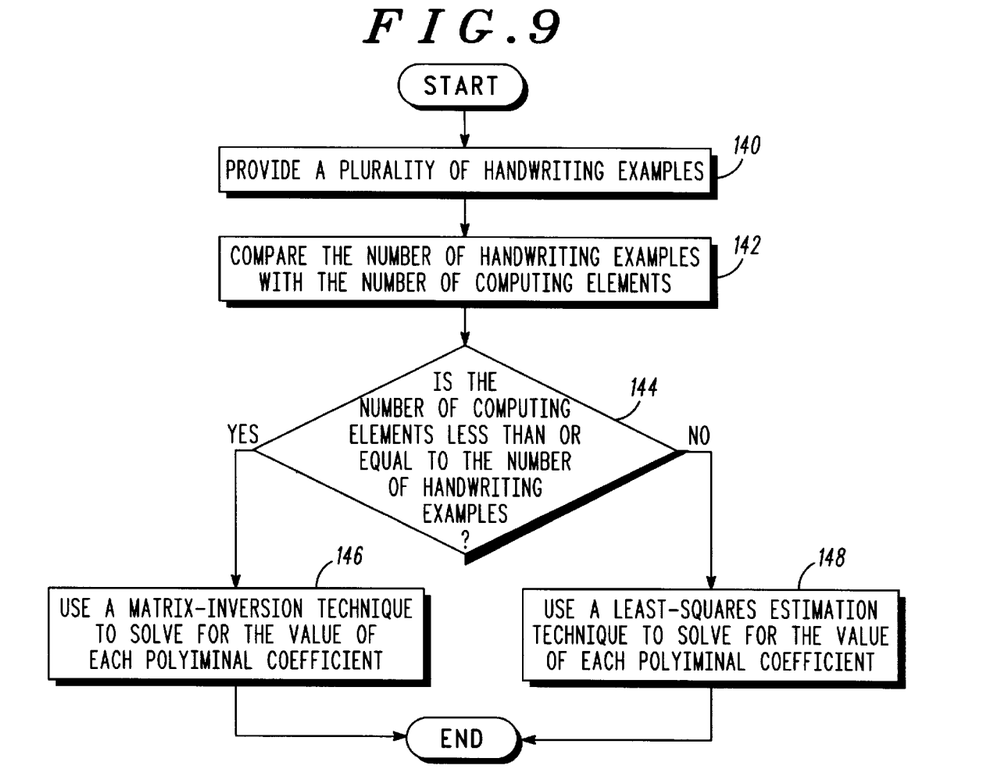
FIG. 9 shows a flow diagram of a method of training a learning machine to classify characters in handwritten text in accordance with a preferred embodiment of the present invention.
Figure 10:
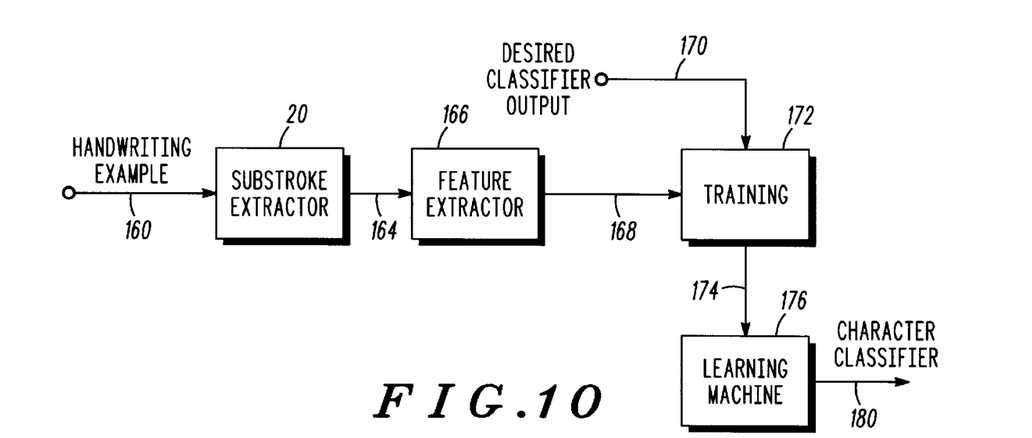
FIG. 10 shows a block diagram of a system to train a learning machine in accordance with an embodiment of the present invention.

FIG. 9 shows a flow diagram of a method of training a learning machine to classify characters in handwritten text in accordance with a preferred embodiment of the present invention. A handwriting recognition system constructed in accordance with an embodiment of present invention has principally two modes of operation: (1) a training mode in which examples of handwritten text are used to train one or more learning machines, and (2) a recognition mode in which unknown characters in a handwritten stroke are identified. Referring to FIG. 10, generally, a user must train learning machine 176 by providing examples of all of the characters and segment strokes that the system is to recognize. In a preferred embodiment of the present invention, a learning machine may be trained to classify a segment stroke by using the same method used to train a learning machine to classify a character.

In a preferred embodiment of the present invention, a learning machine may be trained to be a classifier which implements a discriminant function based on a polynomial expansion of the form given by Equation 1. For the discriminant function to effectively classify input data, the coefficient, $w_{i-1}$, of each term in the polynomial expansion must be determined. This can be accomplished by the use of the following training method.

Referring back to FIG. 9, in box 140, a plurality of handwriting examples is provided to a trainer. A handwriting example comprises two components. The first component is a set of handwriting examples, and the second component is a corresponding desired output, that is, the desired character class to which that the stroke belongs.

Next, in box 142, the trainer compares the number of handwriting examples with the number of computing elements in the classifier.

In decision box 144, a check is made to determine whether the number of computing elements is less than or equal to the number of handwriting examples. If so, the method proceeds to box 146. If not, the method proceeds to box 148.

In box 146, a matrix inversion technique is used to solve for the value of each polynomial coefficient.

In box 148, a least squares estimation technique is used to solve for the value of each polynomial coefficient. Suitable least-squares estimation techniques include, for example, least-squares, extended least-squares, pseudo-inverse, Kalman filter, maximum-likelihood algorithm, Bayesian estimation, and the like.

In implementing a classifier of the present invention, one generally selects the number of computing elements in the classifier to be equal to or less than the number of examples presented to the learning machine.

FIG. 10 shows a block diagram of a system to train a learning machine in accordance with an embodiment of the present invention. Handwriting samples are received by substroke extractor 20 via bus 160. A handwriting sample comprises a sequence of coordinate pairs, wherein each coordinate pair is typically coded as one or more digital words. Substroke extractor 20, in turn generates a plurality of substrokes from each sample and transmits the substrokes over bus 164 to feature extractor 166. Further description of substroke extractor 20 can be obtained by reference to FIG. 2. Feature extractor 166 produces a plurality of features which are passed to trainer 172 over bus 168. In addition, trainer 172 receives desired classifier outputs, which correspond to respective handwriting samples, over bus 170. Trainer 172 computes polynomial coefficients according to the method shown in FIG. 9. These coefficients are passed across bus 174 to learning machine 176. Learning machine 176 utilizes the polynomial coefficients received over bus 174 to create a character classifier. The character classifier is available from learning machine 176 on bus 180.

Feature extractor 166 processes the coordinate pairs of one or more substrokes to extract a set of features, or measurements, that contain the same information as the substroke but with reduced dimensionality. Examples of features which may be extracted by feature extractor 166 are average rectilinear velocity, curvilinear velocity, angular velocity, stroke angle, stroke curvature, Fourier coefficients, or coefficients of a polynomial.

In one embodiment of the present invention, feature extractor 166 calculates coefficients of a first order polynomial which is fitted to a curvilinear velocity profile. These coefficients are then passed to trainer 172. Feature extractor 166 calculates the coefficients by estimating the instantaneous curvilinear velocity of each substroke. A velocity profile is formed by ordering these estimates sequentially according to the order of the substrokes. The polynomial coefficients are then computed using a least squares technique; in other words, the first order polynomial is fitted to the curvilinear velocity profile. The first order polynomial fitted to the curvilinear velocity profile is represented by Equation 2 as follows:

$$v_{(k)} = a_0 + a_1 v_{(k-1)} + a_2 v_{(k-2)} + a_3 v_{(k-3)} \quad \text{Equation 2}$$

where $v_{(k)}$ represents the curvilinear velocity of the kth sample; $v_{(k-1)}$ represents the curvilinear velocity of the (k−1)th sample; $v_{(k-2)}$ represents the curvilinear velocity of the (k−2)th sample; and $v_{(k-3)}$ represents the curvilinear velocity of the (k−3)th sample ; where k is an integer index; and where $a_0$, $a_1$, $a_2$, and $a_3$ represent coefficients of the polynomial fitted to the curvilinear velocity profile.

In another embodiment of the present invention, feature extractor 166 calculates coefficients of a first order polynomial which is fitted to an angular velocity profile. These coefficients are then passed to trainer 172. Feature extractor 166 calculates the coefficients by estimating the instantaneous angular velocity of each sample. A velocity profile is formed by ordering these estimates sequentially according to the order of the samples. The polynomial coefficients are then computed using a least squares technique; in other words, the first order polynomial is fitted to the angular velocity profile. The first order polynomial fitted to the angular velocity profile is represented by Equation 3 as follows:

$$v_{(k)} = b_0 + b_1 v_{(k-1)} + b_2 v_{(k-2)} + b_3 v_{(k-3)} \quad \text{Equation 3}$$

where $v_{(k)}$ represents the angular velocity of the kth sample; $v_{(k-1)}$ represents the angular velocity of the (k−1)th sample; $v_{(k-2)}$ represents the angular velocity of the (k−2)th sample; and $v_{(k-3)}$ represents the angular velocity of (k−3)th sample; where k is an integer index; and where $b_0$, $b_1$, $b_2$, and $b_3$ represent coefficients of the polynomial fitted to the angular velocity profile.

The use of a first order polynomial fitted to a velocity profile is based on the fact that the velocity corresponding to the kth sample can be estimated as a linear combination of the velocities of the three previous frames. The polynomial coefficients will quantify the velocity in a distortion invariant manner, thereby increasing the accuracy of the handwriting recognition system.

In one embodiment of the present invention, the system shown in FIG. 10 is implemented by software running on a processor such as a microprocessor. However, one of ordinary skill in the art will recognize that a programmable logic array, ASIC or other digital logic device could also be used to implement the functions performed by the system shown in FIG. 10.

Figure 11:
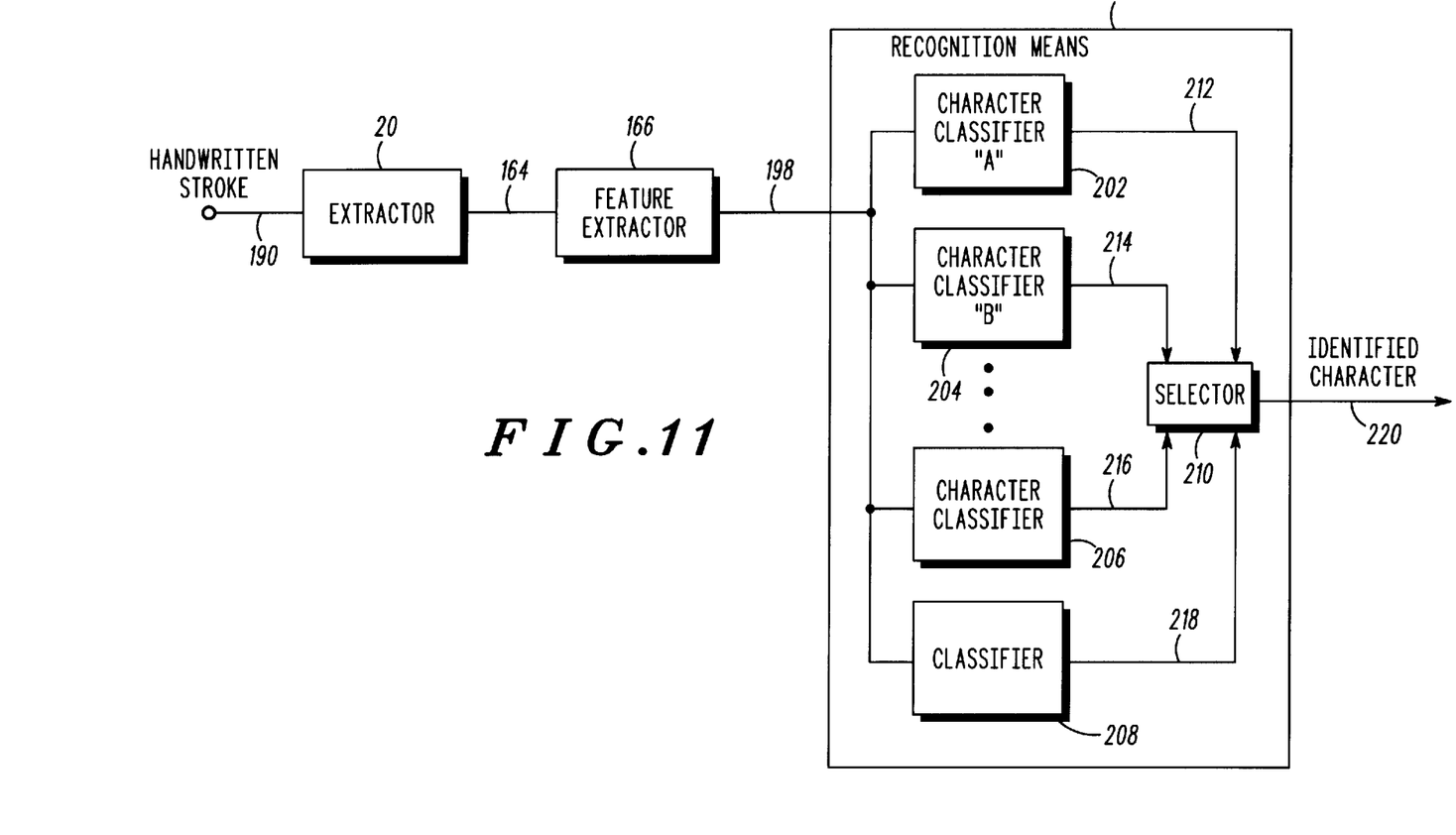
FIG. 11 illustrates a block diagram of a handwriting recognition system in accordance with a further embodiment of the present invention.

FIG. 11 illustrates a block diagram of a handwriting recognition system in accordance with a further embodiment of the present invention. The handwriting recognition system comprises substroke extractor 20, feature extractor 166, and recognition means 200. Recognition means 200, in turn, includes a plurality of classifiers and a selector. Of the plurality of classifiers, character classifier 202, 204, and 206 are shown. Also shown is segment classifier 208.

A handwritten stroke is fed into substroke extractor 20 across bus 190. Substroke extractor 20 extracts a plurality of substrokes from the handwritten stroke. These substrokes are then fed via bus 164 to feature extractor 166. Feature extractor 166 creates a set of relevant features. These features are then distributed by bus 198 to a plurality of classifiers included in recognition means 200. In the example given by FIG. 11, four of the plurality of classifiers are shown.

Each classifier implements a different discriminant function. In the example shown, character classifier 202 implements a discriminant function for the character "A"; while character classifier 204 implements a discriminant function for the character "B"; and character classifier 206 implements a discriminant function for the character "Z". Segment classifier 208 implements a discriminant function for a segment stroke. The discriminant functions implemented by each of the classifiers in recognition means 200 is a polynomial expansion of the form given by Equation 1.

In the example, the result of the discriminant function implemented by character classifier 202 is passed to selector 210 across bus 212; the result of the discriminant function implemented by character classifier 204 is passed across bus 214 to selector 210; and the result of the discriminant function implemented by character classifier 206 is passed across bus 216 to selector 210. In addition, the result of the discriminant function implemented by segment classifier 208 is passed across bus 218 to selector 210.

Selector 210 determines which of the character classifier outputs has the largest amplitude and then produces a representation of the corresponding character identity on output 220. When the handwritten stroke comprises characters which are separated by segment strokes, the segment strokes must also be identified in order to determine the boundaries of each character. Determining the boundaries of a character increases the probability of correctly identifying the character.

Segment strokes are identified in the same manner as characters; that is, they are identified by classifying features.

SUMMARY

Thus there has been described herein a concept, as well as several embodiments including a preferred embodiment, of a method and system for identifying boundaries between characters in handwritten text.

Because the various embodiments of methods and systems for identifying boundaries between characters in handwritten text as herein-described do not require lengthy or repetitive training periods, they are more acceptable to users. Additionally, the various embodiments of the present invention as herein-described allow boundaries between characters in handwritten text to be identified in the same manner that characters are identified, thus reducing the overall complexity and cost of a handwriting recognition system.

It will be apparent to those skilled in the art that the disclosed invention may be modified in numerous ways and may assume many embodiments other than the preferred form specifically set out and described above.

Accordingly, it is intended by the appended claims to over all modifications of the invention which fall within he true spirit and scope of the invention.

What is claimed is:
We claim:
1. A handwriting recognition system, comprising:
a feature extractor for extracting a plurality of features from cursive handwriting, the cursive handwriting comprising a plurality of characters and a segment stroke between the plurality of characters; and
a boundary classifier for generating a boundary classifier output signal based on the plurality of features, a plurality of discriminant function coefficients, and a discriminant function, wherein the plurality of discriminant function coefficients are derived from a plurality of cursive segment stroke examples, each of the cursive segment stroke examples connecting the end point of a first cursive character to the start point of a second cursive character
wherein the discriminant function has a form

$$y = \sum_{i=1}^{m} w_{i-1} x_1^{g1i} x_2^{g2i} \ldots x_n^{gni}$$

Wherein y represents the boundary classifier output signal;
wherein I, m, and n are integers;
wherein wi-1 represents the plurality of discriminant function coefficients;
wherein x1, x2, . . . , xn represents the plurality of features; and
wherein g1i, . . . , gni represent a plurality of exponents of the discriminant function.
2. The handwriting recognition system 1, wherein the boundary classifier includes a neural network.
3. The handwriting recognition system of claim 1, wherein the boundary classifier comprises:
a plurality of computing elements for generating a plurality of discriminant function terms; and
a summing circuit for generating the boundary classifier output signal in response to the plurality of discriminant function terms.
4. The handwriting recognition system of claim 1, wherein at least one of the plurality of features is extracted while the cursive handwriting is being written.
5. The handwriting recognition system of claim 1, wherein the plurality of features are selected from angular velocity, curvilinear velocity, stroke angle, stroke curvature, Fourier coefficients, and a plurality of polynomial coefficients.
6. The handwriting recognition system of claim 1, further comprising:

a plurality of character classifiers for generating a plurality of character classifier output signals in response to the plurality of features; and
a selector for identifying the plurality of characters based on the plurality of character classifier output signals and the boundary classifier output signal.
7. The handwriting recognition system of claim 1, wherein the feature extractor generates the plurality of features by fitting a first order polynomial to a curvilinear velocity profile $$v_{(k)}=a_0+a_1 v_{(k-1)}+a_2 v_{(k-2)}+a_3 v_{(k-3)};$$

wherein $v_{(k)}$ represents the curvilinear velocity of a kth sample datum, $v_{(k-1)}$ represents the curvilinear velocity of a (k-1)th sample datum, $v_{(k-2)}$ represents the curvilinear velocity of a (k-2)th sample datum, $v_{(k-3)}$ represents the curvilinear velocity of a (k-3)th sample datum, k is an integer index, and $a_0$, $a_1$, $a_2$, and $a_3$ represent the plurality of features, and wherein the kth, (k-1)th, (k-2)th, and (k-3)th sample datum are derived from the cursive handwriting.
8. The handwriting recognition system of claim 1, wherein the feature extractor generates the plurality of features by fitting a first order polynomial to an angular velocity profile $$v_{(k)}=b_0+b_1 v_{(k-1)}+b_2 v_{(k-2)}+b_3 v_{(k-3)};$$

wherein $v_{(k)}$ represents the angular velocity of a kth sample datum, $v_{(k-1)}$ represents the angular velocity of a (k-1)th sample datum, $v_{(k-2)}$ represents the angular velocity of a (k-2)th sample datum, $v_{(k-3)}$ represents the angular velocity of a (k-3)th sample datum, k is an integer index, and $b_0$, $b_1$, $b_2$, and $b_3$ represent the plurality of features, and wherein the kth, (k-1)th, (k-2)th, and (k-3)th sample datum are derived from the cursive handwriting.
9. The handwriting recognition system of claim 1, further comprising:
a trainer, operatively coupled to the boundary classifier, for generating the plurality of discriminant function coefficients.
10. The handwriting recognition system of claim 1, wherein the plurality of discriminant function coefficients are derived using a technique selected from least-squares estimation and matrix inversion.
11. In a handwriting recognition system, a method for recognizing a character, the method comprising the steps of:
extracting a plurality of features from cursive handwriting, the cursive handwriting comprising a plurality of characters and a boundary between the plurality of characters;
generating the plurality of features by fitting a first order polynomial to a curvilinear velocity profile $$v_{(k)}=a_0+a_1 v_{(k-1)}+a_2 v_{(k-2)}+a_3 v_{(k-3)};$$

wherein $v_{(k)}$ represents the curvilinear velocity of a kth sample datum, $v_{(-1)}$ represents the curvilinear velocity of a (k-1)th sample datum, $v_{(k-2)}$ represents the curvilinear velocity of a (k-2)th sample datum, $v_{(k-3)}$ represents the curvilinear velocity of a (k-3)th sample datum, k is an integer index, and $a_0$, $a_1$, $a_2$, and $a_3$ represent the plurality of features, and wherein the kth, (k-1)th, (k-2)th, and (k-3)th sample datum are derived from the cursive handwriting,
distributing the plurality of features to a plurality of character classifiers;
generating a plurality of character classifier output signals;

distributing the plurality of features to a boundary classifier;, generating a boundary classifier output signal by applying the plurality of features to a boundary discriminant function: and identifying the character based on the plurality of character classifier output signals and the boundary classifier output signal.

12. The method of claim 11, wherein the step of extracting includes:

extracting at least one of the plurality of features while the cursive handwriting is being written.

13. The method of claim 11 wherein the plurality of features are selected from angular velocity, curvilinear velocity, stroke angle, stroke curvature, Fourier coefficients, and a plurality of polynomial coefficients.

14. In a handwriting recognition system, a method for recognizing a character, the method comprising the steps of:

extracting a plurality of features from cursive handwriting, the cursive handwriting comprising a plurality of characters and a boundary between the plurality of characters;

generating the plurality of features by fitting a first order polynomial to an angular velocity profile $$v_{(k)}=b_0+b_1v_{(k-1)}+b_2v_{(k-2)}+b_3v_{(k-3)};$$

wherein $v_{(k)}$ represents the angular velocity of a kth sample datum, $v_{(k-1)}$ represents the angular velocity of a (k−1)th sample datum, $v_{(k-2)}$ represents the angular velocity of a (k−2)th sample datum, $v_{(k-3)}$ represents the angular velocity of a (k−3)th sample datum, k is an integer index, and $b_0$, $b_1$, $b_2$, and $b_3$ represent the plurality of features, and wherein the kth, (k−1)th, (k−2)th, and (k−3)th sample datum are derived from the cursive handwriting, distributing the plurality of features to a plurality of character classifiers;

generating a plurality of character classifier output signals;

distributing the plurality of features to a boundary classifier;

generating a boundary classifier output signal by applying the plurality of features to a boundary discriminant function;

identifying the character based on the plurality of character classifier output signals and the boundary classifier output signal.

15. A handwriting recognition system, comprising:

a feature extractor for extracting a plurality of features from handwriting, the handwriting comprising a plurality of characters and a boundary between the plurality of characters;

a plurality of character classifiers for generating a plurality of character classifier output signals in response to the plurality of features;

a boundary classifier for generating a boundary classifier output signal by applying the plurality of features to a polynomial discriminant function; wherein the polynomial discriminant function Y(X) has a form $$Y = \sum_{i=0}^{m} w_i \left( \prod_{j=0}^{n} x_j^{g_{ji}} \right);$$

wherein $X=\{x_0, x_1, \ldots, x_n\}$ represents the plurality of features, Y represents the boundary classifier output signal, $w_i$ represents a discriminant function coefficient, $g_{ji}$ represents an exponent, and i, j, m and n are integers; and a selector for identifying the plurality of characters based on the plurality of character classifier output signals and the boundary classifier output signal.

16. The handwriting recognition system of claim 15, wherein the plurality of classifier output signals are generated according to a plurality of polynomial discriminant functions.

17. The handwriting recognition system 15, wherein the boundary classifier includes a neural network.

18. The handwriting recognition system of claim 15, wherein at least one of the plurality of features is extracted while the handwriting is being written.

19. The handwriting recognition system of claim 15, wherein the plurality of features are selected from angular velocity, curvilinear velocity, stroke angle, stroke curvature, Fourier coefficients, and a plurality of polynomial coefficients.

20. The handwriting recognition system of claim 15, wherein the feature extractor generates a plurality of polynomial coefficients by fitting a first order polynomial to a curvilinear velocity profile $$v_{(k)}=a_0+a_1v_{(k-1)}+a_2v_{(k-2)}+a_3v_{(k-3)};$$

wherein $v_{(k)}$ represents the curvilinear velocity of a kth sample datum, $v_{(k-1)}$ represents the curvilinear velocity of a (k−1)th sample datum, $v_{(k-2)}$ represents the curvilinear velocity of a (k−2)th sample datum, $v_{(k-3)}$ represents the curvilinear velocity of a (k−3)th sample datum, k is an integer index, and $a_0$, $a_1$, $a_2$, and $a_3$ represent the polynomial coefficients, and wherein the kth, (k−1)th, (k−2)th, and (k−3)th sample datum are derived from the handwriting.

21. The handwriting recognition system of claim 15, wherein the feature extractor generates a plurality of polynomial coefficients by fitting a first order polynomial to an angular velocity profile $$v_{(k)}=b_0+b_1v_{(k-1)}+b_2v_{(k-2)}+b_3v_{(k-3)};$$

wherein $v_{(k)}$ represents the angular velocity of a kth sample datum, $v_{(k-1)}$ represents the angular velocity of a (k−1)th sample datum, $v_{(k-2)}$ represents the angular velocity of a (k−2)th sample datum, $v_{(k-3)}$ represents the angular velocity of a (k−3)th sample datum, k is an integer index, and $b_0$, $b_1$, $b_2$, and $b_3$ represent the polynomial coefficients, and wherein the kth, (k−1)th, (k−2)th, and (k−3)th sample datum are derived from the handwriting.

22. The handwriting recognition system of claim 15, wherein the boundary classifier comprises:

a plurality of computing elements for generating a plurality of polynomial discriminant function terms; and a summing circuit for generating the boundary classifier output signal in response to the plurality of polynomial discriminant function terms.

* * * * *